(12) United States Patent
Bohn

(10) Patent No.: US 6,555,812 B1
(45) Date of Patent: *Apr. 29, 2003

(54) OPTICS DEVICE DUST SEAL

(75) Inventor: David D Bohn, Ft Collins, CO (US)

(73) Assignee: Hewlett Packard Development Company, L.P., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/408,363

(22) Filed: Sep. 29, 1999

(51) Int. Cl.[7] ................................................. H01J 5/02
(52) U.S. Cl. ........................ 250/239; 358/473; 250/216; 250/234; 250/208.1
(58) Field of Search ................................ 250/216, 239, 250/208.1, 234; 156/84, 102; 358/497, 473, 474

(56) References Cited

U.S. PATENT DOCUMENTS

| | | | |
|---|---|---|---|
| 4,006,377 A | * | 2/1977 | Kosmatka ..................... 313/112 |
| 4,622,501 A | * | 11/1986 | Eventoff et al. ............. 318/627 |
| 5,453,662 A | * | 9/1995 | Gottlieb ........................ 315/82 |
| 5,552,597 A | | 9/1996 | McConica .................... 250/234 |
| 5,578,813 A | | 11/1996 | Allen et al. ............... 250/208.1 |
| 5,644,139 A | | 7/1997 | Allen et al. .................. 250/557 |
| 5,646,394 A | | 7/1997 | Steinle et al. ............ 250/208.1 |
| 5,646,402 A | | 7/1997 | Khovaylo et al. .......... 250/234 |

FOREIGN PATENT DOCUMENTS

CN  314667  2/1986

* cited by examiner

*Primary Examiner*—Que T. Le
*Assistant Examiner*—Thanh X. Luu

(57) ABSTRACT

An optical assembly with having a dust seal incorporated therein is disclosed. The optical assembly has a first portion and a second portion separated by a space wherein at least one optical component is located in the space. The dust seal may be a section of polyolefin tubing or heat shrink tubing that encompasses the space. The dust seal is placed adjacent a section of the first portion and a section of the second portion. Heat is then applied to the dust seal, which causes it to shrink and, thus, conform to the first portion and the second portion. The conforming dust seal seals the optical assembly and prevents contaminants from interfering with the optical components located in the space.

20 Claims, 6 Drawing Sheets

OPTICS DEVICE DUST SEAL

FIELD OF THE INVENTION

The present invention relates to a dust seal for optical devices and, more particularly, polyolefin tubing used to encompass, and thus, seal optical devices.

BACKGROUND OF THE INVENTION

Optical devices are well known in the art and process light and the images represented in light. One type of optical device is known as an optical scanning device. An optical scanning device generates machine-readable image data (sometimes referred to herein simply as image data) representative of an image of the object. Generating image data representative of an image of the object is sometimes referred to as imaging or scanning the object. The image data generated by the optical scanning device may, as an example, be in the form of binary numbers and stored in a data storage device for processing. The following patents which describe optical scanning devices are all hereby incorporated by reference for all that is disclosed therein: U.S. Pat. No. 5,552,597 of McConica for HAND-HELD SCANNER HAVING ADJUSTABLE LIGHT PATH; U.S. Pat. No. 5,646,394 of Steinle for IMAGING DEVICE WITH BEAM STEERING CAPABILITY; and U.S. Pat. No. 5,646,402 of Khovaylo et al. for EXPANDABLE HAND-HELD SCANNING DEVICE.

Some optical scanning devices employ line-focus systems, which image an object by sequentially focusing narrow "scan line" portions of the object onto a linear photosensor array as the optical scanning device is moved relative to the object. Scanning the object is performed by illuminating the object and focusing a narrow scan line portion of the light reflected from the object onto the photosensor array. As the object is moved relative to the optical scanning device, a plurality of scan line images are formed, which taken collectively, represent an image of the object.

A linear photosensor array generally consists of a linear array of photodetector elements (sometimes referred to herein simply as photodetectors), which image small area portions of the scan line. These small area portions of the scan line are commonly referred to as "picture elements" or "pixels." In a contact image sensor-type optical scanning device, there are typically between 300 and 600 photodetectors per inch in the linear array. In a scanning device using a charge-coupled device, there are typically between 1,500 and 2,000 photodetectors per inch in the linear array.

In response to light from its corresponding pixel location on the scan line, each photodetector in the linear photosensor array produces image data which is representative of the light it experiences during an interval of time known as a sampling interval. The image data may, as an example, be in the form of voltages that correspond to the intensity of light received by the photodetectors. For example, a photodetector that receives a relatively high intensity of light may output a relatively high voltage and a photodetector that receives a relatively low intensity of light may output a relatively low voltage. The image data generated by the photodetectors may be received and processed by an appropriate data processing system. Light-colored sections of the object tend to reflect relatively high intensities of light and dark-colored sections of the object tend to reflect relatively low intensities of light. Thus, the photodetectors imaging light-colored sections of the object will receive relatively high intensities of light and will, accordingly, output relatively high image data values representative of the relatively high intensities of light. Photodetectors imaging dark-colored sections will receive relatively low intensities of light and will, accordingly, output relatively low image data values representative of the relatively low intensities of light.

Some optical scanning devices are calibrated to establish a correlation between the image data values and the intensity of light reflecting from the object being imaged. For example, during calibration, the scanning device may image a surface having a predetermined and uniform reflectivity. Under ideal conditions, the image data generated by all of the photodetectors should be a predetermined and uniform value. Due to inconsistencies in the manufacture of the photodetectors, however, the image data values generated by the photodetectors will vary between photodetectors. The calibration process overcomes this problem by scaling the image data values from each photodetector so that the image data values all have the same predetermined value. The scaling factor for each photodetector is stored by the scanning device and used to accurately replicate the image of the object.

The components comprising the optical scanning device are typically enclosed in a sealed housing. The housing has an aperture formed therein that serves to allow light representing an image of the object being scanned to enter the housing. A transparent pane is positioned in the aperture and serves to keep contaminants from entering the housing. The transparent pane may, as an example, be a lens that is used to focus an image of the scan line portion of the object onto the photosensor array. Accordingly, the image of the object being scanned is passed through the aperture and to the photosensor array. In many optical scanning devices, the light path is directed to the photosensor array by the use of other optical components, such as additional lenses and mirrors.

If the light path between the object and the linear photosensor array intersects a contaminant, the contaminant will block the light path and will, thus, corrupt the image data. More specifically, the contaminant will block the light path between a pixel area of the scan line and its corresponding photodetector. Depending on the size of the photodetectors and the contaminant, the contaminant may partially or completely block the light path between a pixel area of the scan line and its corresponding photodetector. For example, if a dust particle is located on a mirror, lens, or photodetector, it will block the light path. This results in the section of the scan line corresponding to the location of the dust particle being imaged as though it is darker than the surface of the object. As the optical scanning device is moved relative to the object and a plurality of scan line portions of the image of the object are generated, all the scan line images will have the above-described darker area caused by the contaminant. When the image of the object is replicated, the darker area on the plurality of scan lines will appear as a dark line on the replicated image. Accordingly each contaminant in the light path may result in a separate dark line on the replicated image of the object.

The contaminant problem may also cause light-colored lines to appear on the replicated image of the object. If a contaminant blocks the light path or partially blocks the light path during the calibration process, the scanning device will recognize the photodetectors corresponding to the contaminant as photodetectors that inherently output low image data values. Accordingly, the scanning device will scale up the values of the image data output by these photodetectors. If the contaminant moves from the light path subsequent to calibration, the corresponding photodetectors will receive more light and will output higher image data values. This results in the replicated image of the object having areas that are lighter than the actual image of the object.

The contaminant problem is exacerbated as the size of the photodetectors decreases. Smaller photodetectors are used to generate a more precise image of the object and are increasingly being used in scanning devices. These smaller photodetectors, however, are more susceptible to contamination because smaller contaminants can block the light path between the object and the smaller photodetectors. Furthermore, a single contaminant may block the light to several of the smaller photodetectors.

Some optical scanning devices overcome the problems associated with contaminants by locating the components comprising the optical scanning device in a sealed housing. Locating the components in a sealed housing however, presents some problems. All of the components being located in the housing must be free of contaminants, otherwise, the contaminants may move from the components to positions where they block the light path as described above. In addition, the entire optical scanning device must be assembled in a contaminant free area, sometimes referred to as a, "clean room." Otherwise, contaminants will likely enter the housing during the assembly process and cause the above-described problems. Likewise, the optical scanning device needs to be placed into a clean room if the housing is ever opened, such as for maintenance and repair service.

Portable optical scanning devices, such as hand-held scanning devices, present additional contaminant problems with regard to their power sources. Most portable optical scanning devices are powered by batteries, which, for ease of use, are typically located in a battery compartment within the housing. Unless the battery compartment is sealed, the process of exchanging the batteries subjects the internal portions of the housing to contamination. This, in turn, subjects the optical components to contamination. Some portable optical scanning devices overcome this problem by providing a separate seal for the battery compartment. Providing a separate seal for the battery compartment, however, tends to increase the cost of the optical scanning device.

Accordingly, a need exists for a device in which contaminants are prevented from interfering with the optical components associated with an optical device.

SUMMARY OF THE INVENTION

A sheath for reducing the probability of contaminants entering an optical device is disclosed herein. The optical device may be of the type having a base portion and a substrate separated by a space wherein the base portion and the substrate are substantially planar and parallel. Optical components may be located in the space between the base portion and the substrate. The sheath may be in the form of a heat shrink material, such as polyolefin tubing, that may encompass the space and may be adjacent the base portion and the substrate. The heat shrink material may then be heated so as to resiliently engage the base portion and the substrate. Thus, the heat shrink material serves as a barrier to contaminants and substantially reduces the probability that contaminants may enter the optical device.

DETAILED DESCRIPTION OF THE INVENTION

Figure 1:
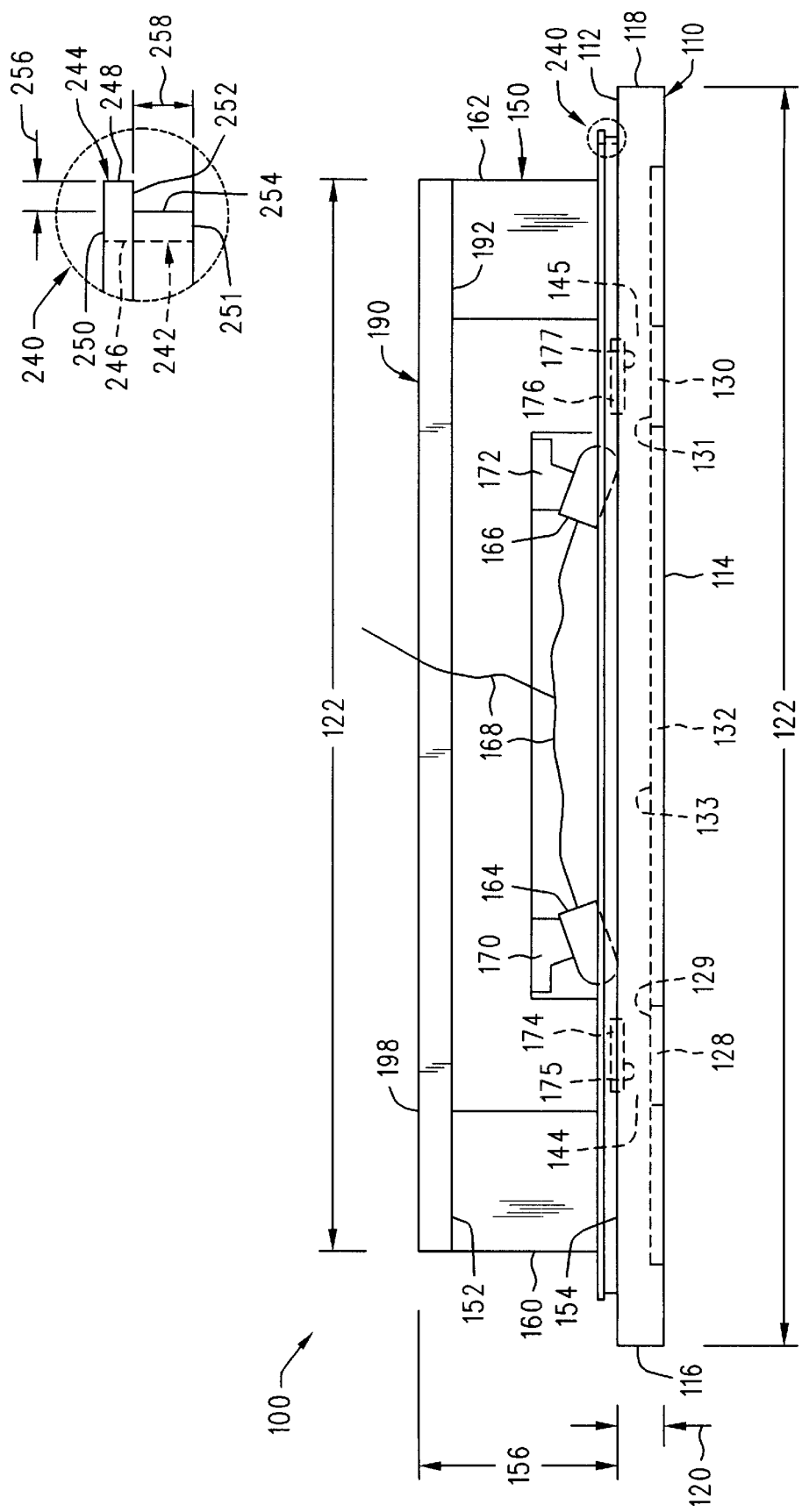
FIG. 1 is a front elevation view of an optical assembly without a sheath applied thereto.

FIGS. 1 through 6, in general, illustrate method of reducing the level of contamination entering an optical assembly 100 comprising: providing the optical assembly 100 having a first portion 110 and a second portion 190, wherein the first portion 110 is separated from the second portion 190 by a space, and wherein at least one optical component is located in the space between the first portion 110 and the second portion 190; providing a sheath 200 capable of transforming from a first state to a second state wherein the area of the sheath 200 in the first state is greater than the area of the sheath 200 in the second state; locating the sheath 200 adjacent at least one section 248 of the first portion 110 and at least one section 198 of the second portion 190; encompassing at least one portion of the space between the first portion 110 and the second portion 190 with the sheath 200 in the first state; and causing the sheath 200 to transform from the first state to the second state.

FIGS. 1 through 6 also, in general, illustrate an optical device 100 comprising: a first portion 110 and a second portion 190, wherein the first portion 110 is separated from the second portion 190 by a space; at least one optical component located in the space between the first portion 110 and the second portion 190; a sheath 200 extending between at least one section 248 of the first portion 110 and at least one section 198 of the second portion 190; a housing 104 substantially encompassing the sheath 200; wherein the sheath 200 is capable of transforming from a first state to a second state, wherein the area of the sheath 200 in the first state is greater than the area of the sheath 200 in the second state.

FIGS. 1 through 6 also, in general illustrate an optical scanning device 102 comprising: a housing 104; an optical device 100 located in the housing 104, the optical device 100 comprising: a first portion 110 and a second portion 190, wherein the first portion 110 is separated from the second portion 190 by a space; at least one optical component located in the space between the first portion 110 and the second portion 190; a sheath 200 extending between at least one section 248 of the first portion 110 and at least one section of the second portion 190; wherein the sheath 200 is capable of transforming from a first state to a second state, wherein the area of the sheath 200 in the first state is greater than the area of the sheath 200 in the second state.

Having generally described the optical assembly 100 and the method for sealing the optical assembly 100, they will now be described in further detail. Referring to FIG. 1, the following description summarily describes the optical assembly 100 with and without a sheath 200, FIG. 4, applied thereto. A detailed description of the optical assembly 100 with and without the sheath 200 applied thereto follows the summary description. It is noted that the optical assembly 100 is described herein as being of the type used in a hand-held scanning device for illustration purposes only. It is to be understood, however, that the sheath 200 and method for sealing an optical assembly 100 described herein may be applied to optical assemblies used in devices other than hand-held scanning devices, such as copiers and facsimile machines or, generally, in any application where it is desirable to prevent the entry of contaminants.

The optical assembly 100 may serve to convert an image of an object, not shown, to machine-readable image data, which is sometimes referred to herein simply as image data. Generating image data representative of an image of an object is often referred to as imaging or scanning the object. The imaging process is achieved by generating image data representative of a plurality of narrow scan line portions of the image of the object as the optical assembly 100 is moved relative to the object. An optical position sensing system detects the position of the optical assembly 100 relative to the object during the scanning process and electronically tags the image data representing the scan line portions with position data. A processor, not shown, may replicate the image of the object based on the image data and its associated position data in a conventional manner. Examples of optical scanning devices and optical position sensing systems are further described in the following U.S. Pat. No. : 5,644,139 of Allen et al. for NAVIGATION TECHNIQUE FOR DETECTING MOVEMENT OF NAVIGATION SENSORS RELATIVE TO AN OBJECT; and U.S. Pat. No. 5,578,813 of Allen et al. for FREEHAND IMAGE SCANNING DEVICE WHICH COMPENSATES FOR NONLINEAR MOVEMENT, which are both hereby incorporated by reference for all that is disclosed therein.

More specifically, the optical assembly 100 directs the image of the object from the surface of the object to a photosensing device. The photosensing device is described herein as being a linear array of photodetectors 194, FIG. 2. The linear array of photodetectors 194 converts the image of a scan line portion of the object to image data in a conventional manner. The optical assembly 100 may have mirrors, lenses, and other optical components that serve to focus the image of the object onto the array of photodetectors 194.

If contaminants are present in the light path between the object and the linear array of photodetectors 194, the contaminants will corrupt the image of the object as it appears on the array of photodetectors 194. This, in turn, will cause the image data to be corrupt. In other words, the image data will not be an accurate representation of the object. For example, if a dust particle is located on a mirror, lens, or other optical component in the light path between the object and the array of photodetectors 194, it will block the light path. Accordingly, the image of the object corresponding to the dust particle will be imaged as though it is a dark area on the object. Thus, the image data will not accurately reflect the image of the object.

In a conventional optical assembly, there are many areas that are especially susceptible to contamination. For example, optical assemblies are typically designed with spaces or gaps throughout to facilitate high tolerances of component sizes during manufacturing. These spaces, however, also allow contaminants to enter the optical assembly and cause the aforementioned problems. Contaminants may also enter the optical assembly during manufacturing. For example, if the optical assembly is used in a larger device, the optical assembly may become contaminated if the larger device is not cleared of contaminants prior to assembly. Additional contaminants may enter the optical assembly during repair. For example, if the larger device is opened in an unclean environment for repair, contaminants may enter the optical assembly as describe above.

Figure 4:
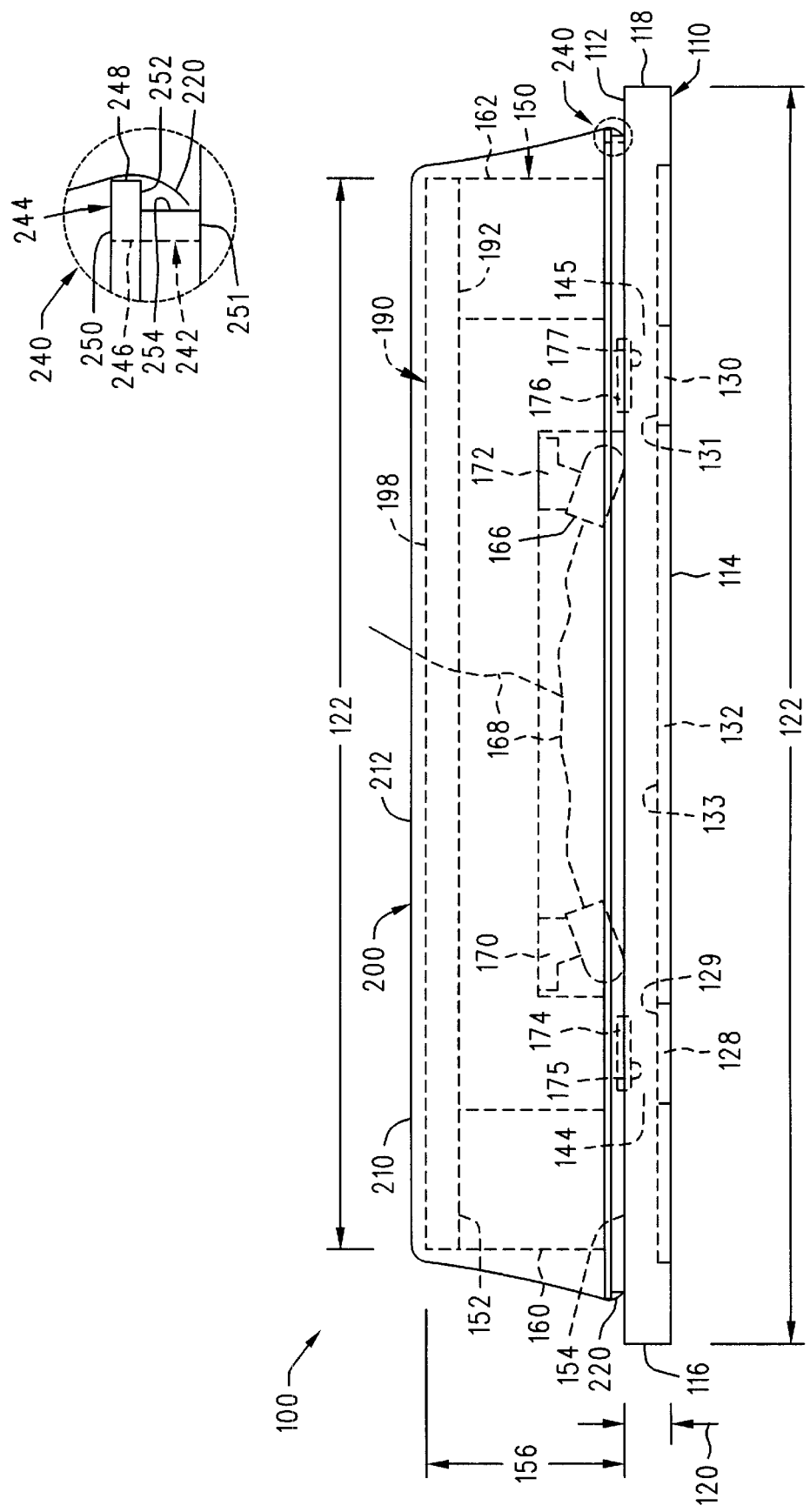
FIG. 4 is a side elevation view of the optical assembly of FIG. 1 with a sheath applied thereto.

Referring to FIG. 4, the optical assembly 100 disclosed herein lessens the likelihood that contaminants will corrupt its image data by providing a sheath 200. The sheath 200 encompasses the optical components comprising the optical assembly 100 and, thus, lessens the likelihood that contaminants will interfere with the optical components. As will be described in detail below, the sheath 200 may, as an example, be a heat-shrinkable material, such as conventional heat shrink tubing.

Having summarily described the optical assembly 100, it will now be described in greater detail.

Figure 2:
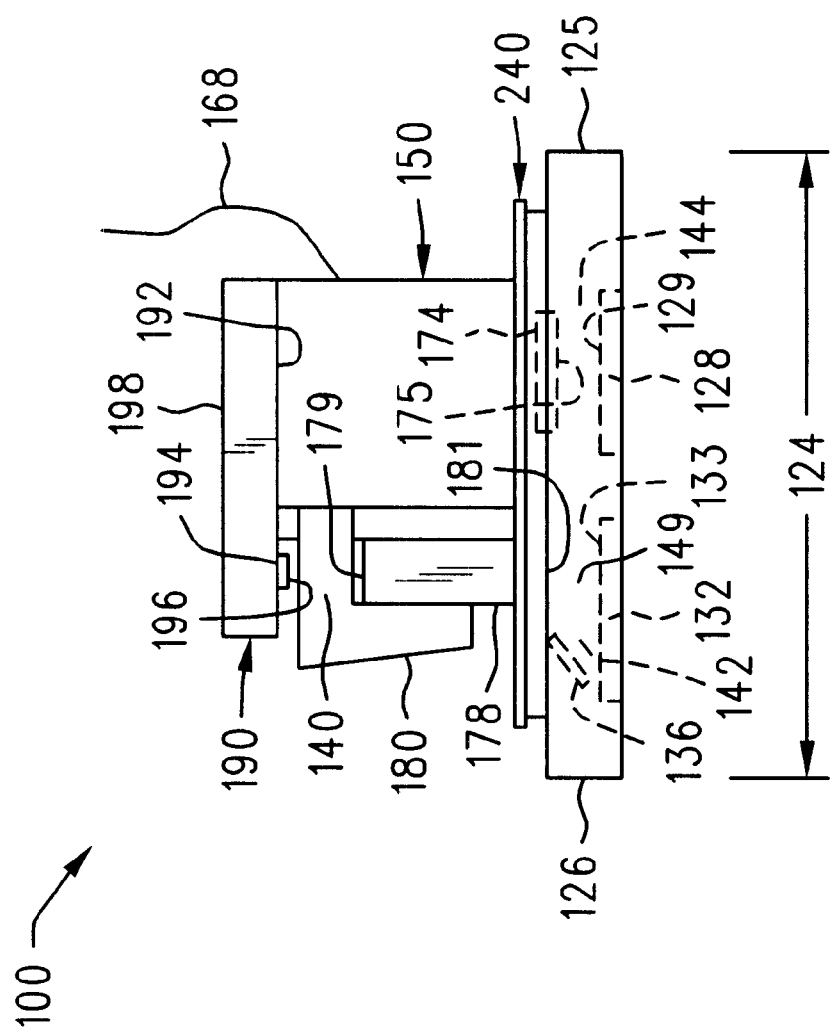
FIG. 2 is a side elevation view of the optical assembly of FIG. 1 without a sheath applied thereto.

Referring to FIG. 1, the optical assembly 100 may have a base portion 110 with a chassis 150 attached thereto. The base portion 110 may have an upper portion 112, a lower portion 114, a left portion 116, and a right portion 118. The upper portion 112 and the lower portion 114 may be separated by a height 120, which may, for example, be about three millimeters. The left portion 116 and the right portion 118 may be separated by a length 122, which may, for example, be about 138 millimeters. Referring to FIG. 2, which is a view of the optical assembly 100 taken from the right side thereof as viewed in FIG. 1. The base portion 110 of the optical assembly 100 may have a front portion 125 and a rear portion 126 separated by a width 124, which may, for example, be about 38 millimeters.

Figure 3:
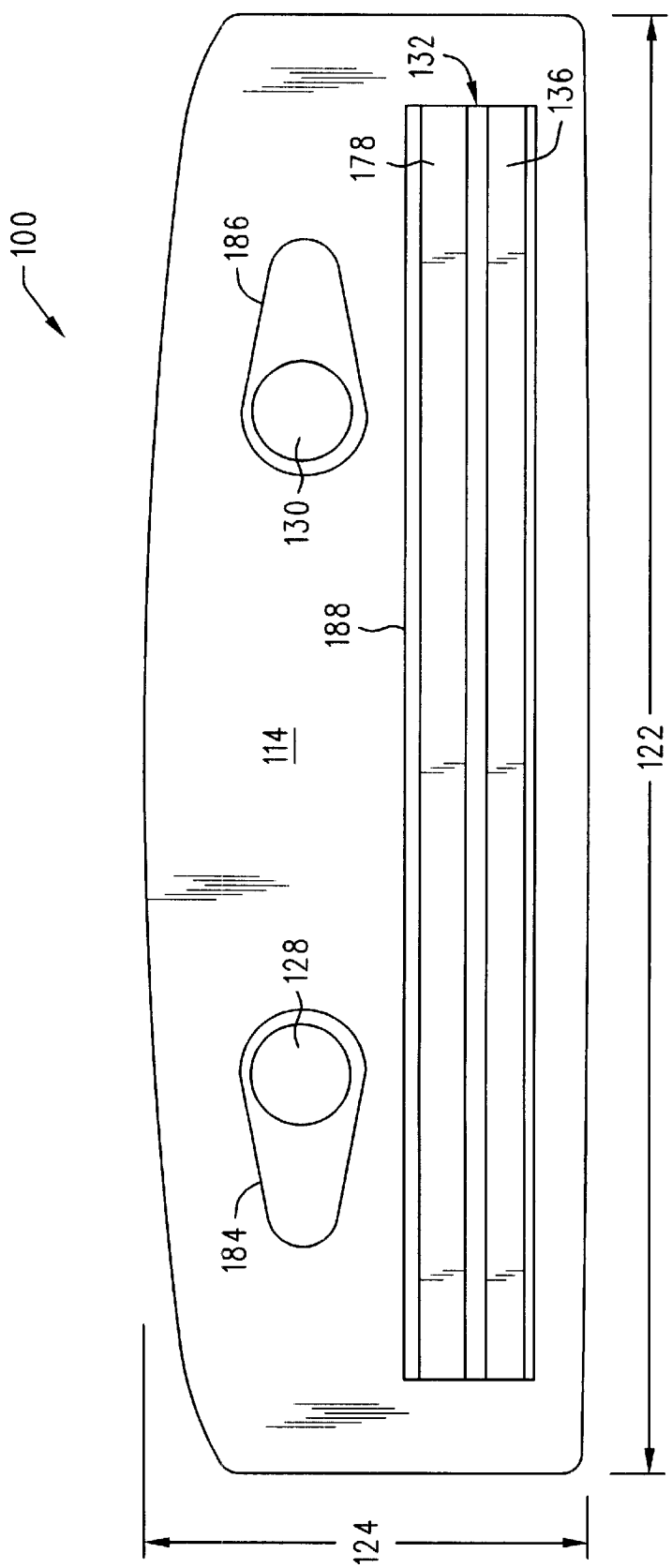
FIG. 3 is a bottom view of the optical assembly of FIG. 1.

Referring to FIG. 3, which is a bottom view of the optical assembly 100, the base portion 110 may have several openings located therein. The base portion 110 may have a first opening 184, a second opening 186, and a third opening 188 formed therein. The first opening 184 may have a first transparent pane 128 located therein, the second opening 186 may have a second transparent pane 130 located therein, and the third opening 188 may have a third transparent pane 132 located therein. The first opening 184 and the second opening 186 are illustrated in FIG. 3 as being substantially oval and the first transparent pane 128 and second transparent pane 130 are illustrated as being substantially round. Only round portions of the first opening 184 and the second opening 186 corresponding to the first transparent pane 128 and the second transparent pane 130 may actually pass through the base portion 110. As will be described below, the first opening 184 and the second opening 186 may serve to facilitate navigation and the third opening 188 may serve to facilitate imaging. Referring again to FIG. 2, the first transparent pane 128 may have an upper surface 129. The third transparent pane 132 may have an upper surface 133. Referring again to FIG. 1, the second transparent pane 130, may have an upper surface 131.

The chassis 150 may be attached to the upper portion 112 of the base portion 110 as described below. The chassis 150 may have an upper portion 152, a lower portion 154, a left portion 160, and a right portion 162. The lower portion 154 may be attached to the upper portion 112 of the base portion 110 in a conventional manner. For example, the upper portion 112 of the base portion 110 and the lower portion 154 of the chassis 150 may both be provided with tabs that allow the base portion 110 to snap fit to the chassis 150. A printed circuit board 190 may be attached to the upper portion 152 of the chassis 150. The printed circuit board 190 may have an upper surface 198 and a lower surface 192 wherein the lower surface 192 is attached to the upper portion 152 of the chassis 150. A height 156 may extend between the upper portion 112 of the base portion 110 and the upper surface 198 of the printed circuit board 190. The height 156 may, for example, be about 17 millimeters. As will be described below, the printed circuit board 190 may serve to physically hold and electrically connect electrical components required for the operation of the optical assembly 100.

Referring again to FIG. 1, the chassis 150 may have a first LED 164, a second LED 166, a first navigator 174, and a second navigator 176 located therein. The first LED 164 may be attached to the chassis 150 by way of a first LED support 170 and the second LED 166 may be attached to the chassis 150 by way of a second LED support 172. Wires 168 may extend from the first LED 164 and the second LED 166 out of the chassis 150. The first LED 164 and the second LED 166 may be conventional LEDs that emit a predetermined frequency band and intensity of light.

The first navigator 174 and the second navigator 176 may be two-dimensional photosensor arrays that image two-dimensional area portions of the object. Examples of such two-dimensional photosensor arrays are described in the U.S. Pat. No. : 5,644,139 of Allen et al. and U.S. Pat. No. 5,578,813 of Allen et al., both of which have been previously referenced. The first navigator 174 may have a lower surface 175 and the second navigator 176 may have a lower surface 177. The first navigator 174 may be located proximate the first transparent pane 128 and the first LED 164. Likewise, the second navigator 176 may be located proximate the second transparent pane 130 and the second LED 166. A space 144 may exist between the upper surface 129 of the first transparent pane 128 and the lower surface 175 of the first navigator 174. Likewise, a space 145 may exist between the upper surface 131 of the second transparent pane 130 and the lower surface 177 of the second navigator 176. These spaces may allow contaminants to settle on the upper surface 129 of the first transparent pane 128, the upper surface 131 of the second transparent pane 130, the lower surface 175 of the first navigator 174, and the lower surface 177 of the second navigator 176.

As will be described below, the first LED 164 and the second LED 166 may serve to illuminate area portions of the object in order for the processor, not shown, to determine the position of the optical assembly 100 relative to the object. Light may pass from the first LED 164, through the first transparent pane 128, where it may reflect from the object and pass back through the first transparent pane 128 to the first navigator 174. Likewise, light may pass from the second LED 166, through the second transparent pane 130, where it may reflect off the object and pass back through the second transparent pane 130 to the second navigator 176.

A lip 240 may be integrally formed with the upper portion 112 of the base portion 110. The lip 240 may be an elongated member that substantially encircles the chassis 150. An exploded cross-sectional view of the lip 240 is illustrated in FIGS. 1 and 4. The lip 240 may be L-shaped and may have a vertical portion 242 and a horizontal portion 244. The vertical portion 242 may have a inner side 246, a lower side 251, and a lower vertical side 254. The horizontal portion 244 may have a outer side 248, a upper side 250, and a lower vertical side 254. A width 256 may extend between the lower vertical side 254 and the outer side 248. A height 258 may extend between the lower side 251 and the lower horizontal side 252. As will be described below, the lip 240 may serve to secure the sheath to the base portion 110.

Referring again to FIG. 2, a light panel 136, a lens 178, a baffle 180, and a linear array of photodetectors 194 may also be located in the optical assembly 100. The photodetectors 194 may be linearly arranged on the lower surface 192 of the printed circuit board 190 in a conventional manner so as to image a scan line portion of the object. The photodetectors 194 may have surfaces 196 that face the base portion 110. The light panel 136 may, as an example, be a linear array of LEDs and may serve to illuminate a scan line portion of the object being imaged in a conventional manner.

The lens 178 may, as an example, be a gradient index array and may serve to focus light from the object onto the surfaces 196 of the photodetectors 194. The lens 178 may be physically attached to the chassis 150. The lens 178 may have an upper surface 179 and a lower surface 181. The baffle 180 may be affixed to the chassis 150 and may serve to position the lens 178 between the third window 132 and the photodetectors 194. The baffle 180 may also serve to keep extraneous light from intersecting the surfaces 196 of the photodetectors 194.

A space 142 may exist between the light panel 136 and the upper surface 133 of the third transparent pane 132. A space 149 may exist between the upper surface 133 of the third transparent pane 132 and the lower surface 181 of the lens 178. A space 140 may exist between the upper surface 179 of the lens 178 and the surfaces 196 of the photodetectors 194. As will be described below, the spaces 142, 149, and 140 are areas where contaminants may interfere with light used to image the object, which, in turn, may cause the image data generated by the photodetectors 194 to be corrupt.

Having described the components comprising the optical assembly 100, the operation of the optical assembly 100 will now be described followed by a description of the optical assembly 100 with the sheath 200, FIG. 4, attached thereto.

Referring to FIGS. 1 and 2, in summary, the optical assembly 100 serves to generate image data representative of an image of an object, not shown. Generating image data representative of the object is sometimes referred to as imaging or scanning the object. Imaging the object is achieved by the photodetectors 194 generating image data of successive scan line portions of the image of the object. The first navigator 174 and the second navigator 176 simultaneously generate image data representative of two-dimensional area portions of the image of the object, which are ultimately used to determine the position of the optical assembly 100 relative to the object. The image data generated by the photodetectors 194, the first navigator 174, and the second navigator 176 are transmitted to a processor, not shown. The processor determines the position of the optical assembly 100 relative to the object in a conventional manner as image data of scan lines is being generated. The processor is then able to replicates the image of the object by electronically locating the scan lines relative to each other based on the position of the optical assembly 100 relative to the object at the time the scan lines were imaged.

Having summarily described the operation of the optical assembly 100, it will now be described in greater detail. The optical assembly 100 functions to generate image data representative of scan line portions of the object and two two-dimensional area portions of the object. The image data representative of the scan line portions is for imaging purposes and the image data representative of the two two-dimensional area portions is for navigation purposes. The navigation function will be described first followed by a description of the imaging function.

Referring again to FIG. 1, navigation is achieved by continuously imaging two-dimensional portions of the object corresponding to the first navigator 174 and the second navigator 176. These two-dimensional area portions of the object are illuminated by the first LED 164 and the second LED 166. More specifically, electric current is passed through the wires 168 to the first LED 164 and the second LED 166, which causes them to emit light. The emitted light passes through the first transparent pane 128 and the second transparent pane 130 to illuminate the two-dimensional portions of the object. Light then reflects from the two-dimensional area portions of the object and passes through the first transparent pane 128 and the second transparent pane 130 and to the first navigator 174 and the second navigator 176 respectively.

The reflected light is a representation of the image of the surface of the object, including images of distinct features of the surface of the object. For example, if the object is a sheet of paper, the distinct features may be minute inconsistencies in the surface of the paper caused by pulp material used in the manufactures of the paper. The first navigator 174 and the second navigator 176 generate image data representative of these minute features of the object and transmit the image data to the processor. As the optical assembly 100 moves relative to the object, the locations of these distinct features move relative to the first navigator 174 and the second navigator 176. The processor is able to determine the displacement of the optical assembly 100 relative to the object by measuring the movement of the distinct features relative to the first navigator 174 and the second navigator 176. Examples of imaging features of an object to determine the position of an optical assembly relative to the object are further described in the following U.S. Pat. No. : 5,644,139 of Allen et al. and U.S. Pat. No. 5,578,813 of Allen et al., both of which have been previously referenced.

Having described the navigation system, the imaging system will now be described. Referring again to FIG. 2, the photodetectors 194 image successive scan line portions of the object as the optical assembly 100 is moved relative to the object. The cumulation of successive scan line portions represent an image of the object. More specifically, the light panel 136 emits light that passes through the third transparent pane 132 to illuminate a scan line portion of the object. Light representative of an image of the scan line portion is reflected from the object and passes through the third transparent pane 132 to the lower surface 181 of the lens 178. The reflected light is then focused by the lens 178 onto the surfaces 196 of the photodetectors 194. The photodetectors 194 then convert the image of the scan line portion to image data in a conventional manner.

Under ideal conditions, there are no contaminants in the light paths between the light panel 136 and the object, nor are there contaminants in the light path between the object and the photodetectors 194. Ideal conditions in a conventional optical assembly, however, are difficult to achieve. In reality, contaminants may enter the spaces 142, 149, and 140. Contaminants may also be present on the upper surface 133 of the third transparent pane 132, the upper surface 179 and the lower surface 181 of the lens 178, and the surface 196 of the photodetectors 194. These contaminants partially block the light paths between the light panel 136 and the object and between the object and the photodetectors 194. Accordingly, the portions of the scan line of the object corresponding to the locations of the contaminants will appear as dark portions regardless of the true reflectivity of these portions. These dark portions, in turn, will cause the replicated image of the object to have dark lines extending throughout, wherein the dark lines correspond to the contaminants.

Referring again to FIG. 1, under ideal conditions, there are also no contaminants in the space 144 between the first transparent pane 128 and the first navigator 174. Nor are there any contaminants in the space 145 between the second transparent pane 130 and the second navigator 176. In a conventional optical assembly, however, it is very likely that contaminants will enter the spaces 144, 145. Specifically, the contaminants will become disposed on the lower surface 175 of the first navigator 174, the lower surface 177 of the second navigator 176, the upper surface 129 of the first transparent pane 128, and the upper surface 131 of the second transparent pane 130. These contaminants will appear, and be imaged, as though they are distinct features on the surface of the object. They, however, will not move relative to the first navigator 174 and the second navigator 176 as the optical assembly 100 is moved relative to the object. Thus, they will tend to confuse the processor as to the displacement of the optical assembly 100 relative to the object.

Referring to FIG. 4, the optical assembly 100 disclosed herein alleviates the above-described contamination problems associated with conventional optical assemblies by having a sheath 200 encompass the chassis 150. The sheath 200, thus, encompasses the optical components comprising the optical assembly 100. The sheath 200 may as an example, be a section of polyolefin tubing, which is also known as heat shrink tubing. Alternatively, the sheath 200 may be an adhesive material, such as plastic or vinyl tape, e.g., electrical tape. The sheath 200 is described herein as being a length of polyolefin or heat shrink tubing. The sheath 200 may have an upper portion 210 and a lower portion 220, which may be ends of the tubing. The upper portion 210 may have an opening 212. Likewise the lower portion 220 may have an opening, not shown. The sheath 200 may, as an example, be flexible polyolefin tubing of the type commercially available from the 3M Company of Minneapolis, Minn. as model number FP-301.

The sheath 200 is described herein as having two states, a pre-shrunk state and a shrunk state. The pre-shrunk state is the state of the sheath 200 prior to the application of heat. The shrunk state is the state of the sheath 200 subsequent to the application of heat wherein the application of heat has caused the sheath 200 to shrink from its pre-shrunk state. The pre-shrunk sheath 200 may be appropriately sized to fit over the chassis 150 and may extend from the upper portion 112 of the base portion 110 to the upper surface 198 of the printed circuit board 190. For example, the pre-shrunk sheath 200 may have a diameter of about 101.6 millimeters and a length of about 18 millimeters. The shrunk sheath 200 may substantially conform to the outer side 248 of the lip 240, the chassis 150, and the printed circuit board 190.

In order to assemble the sheath 200 to the optical assembly 100, the pre-shrunk sheath 200 is placed over the chassis 150 so that the lower portion 220 is adjacent the upper portion 112 of the base portion 110. More specifically, the lower portion 220 encircles the outer side 248 of the lip 240 and extends beyond the horizontal portion 244 toward the upper portion 112 of the base portion 110. The upper portion 210 of the sheath 200 extends beyond the upper surface 198 of the printed circuit board 190. The wires 168 from the first LED 164 and the second LED 166 pass through the opening 212 in the upper portion 210 of the sheath 200. Other wires, not shown, from other electrical components on the optical assembly 100 may also pass through the opening 212.

When the pre-shrunk sheath 200 is appropriately located relative to the optical assembly 100, heat is applied to the sheath 200, which causes it to shrink to its shrunk state. As the sheath 200 shrinks, its shape conforms to the shape of the lip 240, the chassis 150, and the printed circuit board 190. In this manner, the sheath 200 causes an elastic force to act around the printed circuit board 190, which creates a seal around the printed circuit board 190.

A seal is also created in the proximity of the upper portion 112 of the base portion 110 via the lip 240. The lower portion 220 of the sheath 200 contacts the outer side 248 of the lip 240. The section of the lower portion 220 below the lower horizontal side 252 curves inwardly toward the lower vertical side 254. Thus, the seal is formed by the intersection of the sheath 200 and the outer side 248 of the lip 240.

These seals alleviate the above-described contamination problem. More specifically, the upper portion 210 of the sheath 200 substantially conforms to the perimeter of the printed circuit board 190. In addition, the top portion 210 of the sheath 200 partially wraps around the upper surface 198 of the printed circuit board 190. Likewise, the lower portion 220 of the sheath 200 wraps around the horizontal portion 244 of the lip 240 and substantially conforms to the outer side 248 of the lip 240. Accordingly, the optical components comprising the optical assembly 100 are substantially sealed from external contamination.

Figure 5:
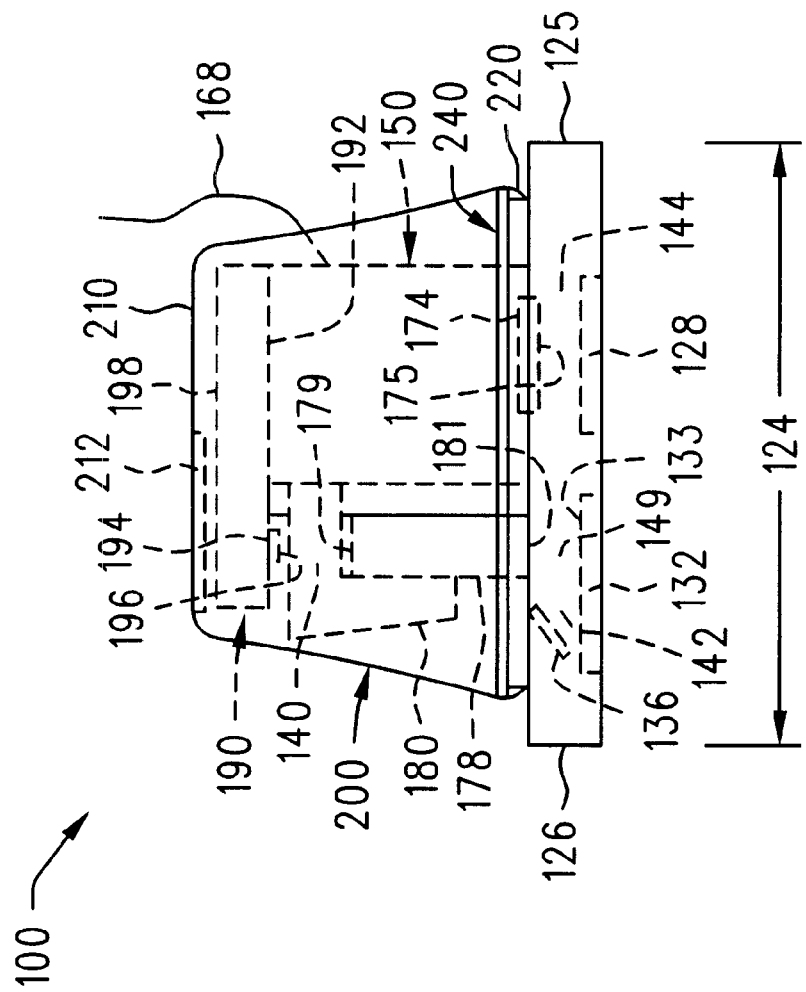
FIG. 5 is an end elevation view of the optical assembly of FIG. 4 with a sheath applied thereto.

Contaminants are, thus, less likely to enter the spaces 144 and 145. Contaminants are also less likely to become disposed on the lower surface 175 of the first navigator 174, the lower surface 177 of the second navigator 176, the upper surface 129 of the first transparent pane 128, and the upper surface 131 of the second transparent pane 130. This reduction in contaminants reduces the above-described navigation errors caused by contaminants interfering with the optical assembly 100. Referring to FIG. 5, which is a side view of the optical assembly 100 of FIG. 4, contaminants are less likely to enter the spaces 140, 142, and 149. Contaminants are also less likely to become disposed of on the upper surface 133 of the third transparent pane 132, the upper surface 179 and lower surface 181 of the lens 178, and the surfaces 196 of the photodetectors 194. This reduction in contaminants reduces above-described errors in the image data caused by contaminants. It should be noted that the preferred color of the sheath 200 is black or another light absorbing color. This light absorbing color reduces the chance of extraneous light reflecting from the sheath 200 and being imaged by the photodetectors 194, the first navigator 174, FIG. 4, or the second navigator 176.

Figure 6:
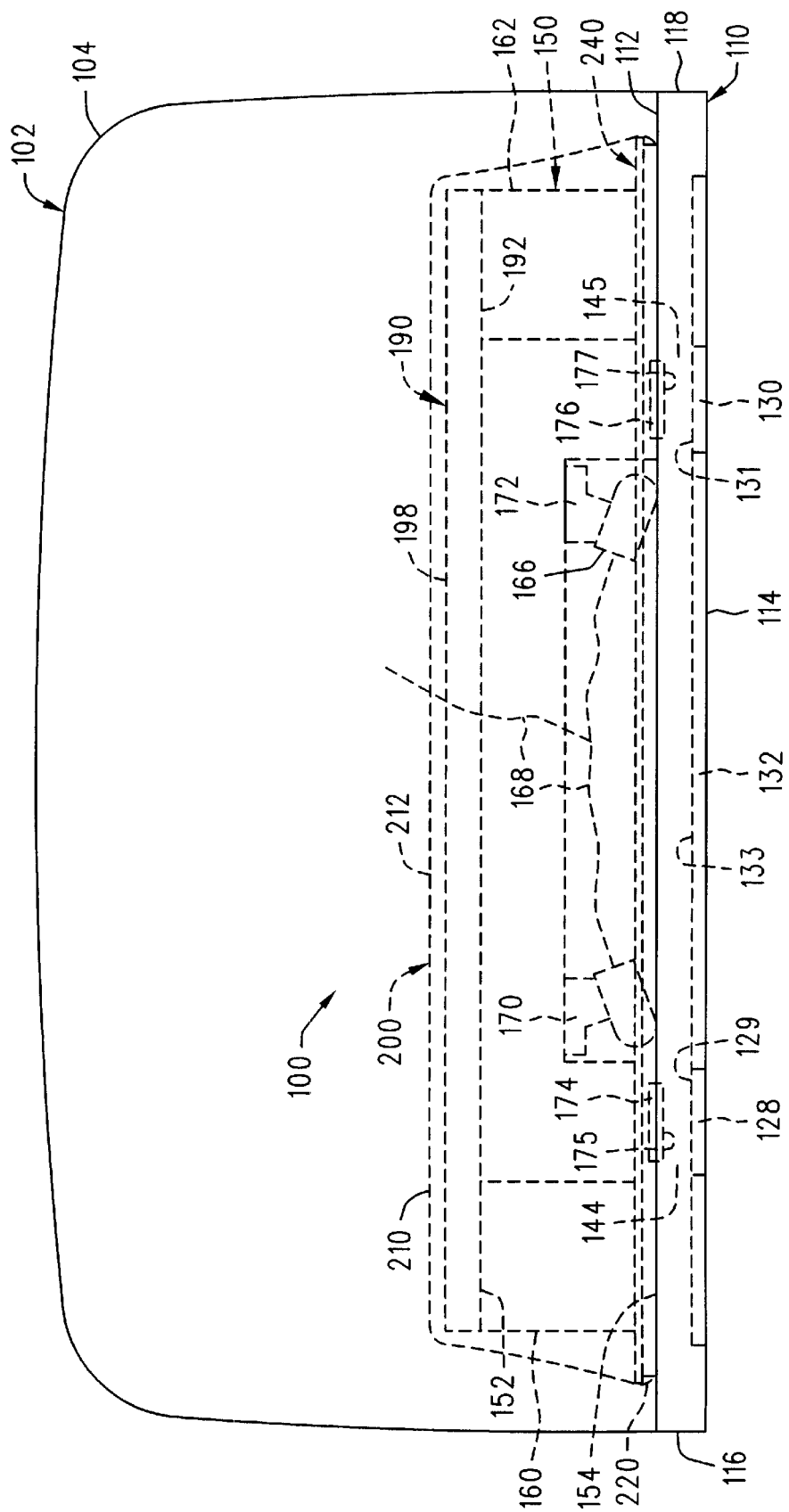
FIG. 6 is a cut away view of a hand-held scanner with the optical assembly of FIG. 4 mounted therein.

Referring to FIG. 6, the optical assembly 100 may be mounted in a housing 104 of a hand-held type scanning device 102. The housing 104 may be a rigid structure that contains other electrical components necessary for imaging an object. Additionally, during the scanning process, a user may grasp the housing 104 and move the housing 104, including the optical assembly 100, relative to an object being scanned in a conventional manner. The above-described seals created by the sheath 200 substantially reduce the amount of contaminants that may pass from the housing 104 into the optical assembly 100. Accordingly, the assembly of the optical assembly 100 into the housing 104 does not have to be completed in an environment that is as contaminant free as with the assembly of the optical assembly 100. This reduction in the contaminant free areas required for the manufacture of the scanning device 102 may, in turn, reduce the cost of the scanning device 102.

Sheaths 200 may be applied to optical assemblies 100 in an assembly line process. For example, pre-shrunk sheaths 200 may be cut to predetermined lengths, e.g., 18 millimeters. Optical assemblies 100 may be moved on the assembly line via a conveyor belt. The sheaths 200 may then be placed over the chassis 150 as the optical assemblies 100 are moved on the conveyor belt. An operator may, as an example, use a substantially cone-shaped fixture to slide the sheaths over the chassis 150. The optical assemblies 100 may then be moved past heat sources that apply heat to the circumference of the sheaths 200 causing them to shrink and conform to the optical assemblies 100 as described above. For example, the conveyor belt may pass through a radiant or convection type of oven that heats the sheaths 200 and, thus, causes them to shrink.

The optical assembly 100 with the sheath 200 applied thereto may be used in several devices. For example, the optical assembly 100 may be assembled into a hand-held type scanning device. The sheath 200 reduces the contaminants that may affect the optical components in the optical assembly 100. Thus, the optical assembly 100 may be assembled in a relatively contaminant free environment. After the sheath 200 has been applied to the optical assembly 100, the optical assembly 100 may be moved to a less contaminant free environment for final assembly into the remainder of the hand-held scanning device. By only requiring the optical assembly 100 to be assembled in a relatively contaminant free environment, the cost of the hand-held scanning device may be reduced. In addition, should the hand-held scanning device need to be opened for any reason, the likelihood of the optical components being contaminated during opening is reduced by the sheath 200.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A method of reducing the level of contamination entering an optical assembly of a scanning device, said method comprising:

providing said optical assembly of a scanning device, said optical assembly comprising at least one photodetector, a first portion and a second portion, wherein said first portion is separated from said second portion by a space, and wherein said at least one photodetector is located in said space between said first portion and said second portion;

providing a sheath capable of transforming from a first state to a second state wherein the area of said sheath in said first state is greater than the area of said sheath in said second state;

encompassing at least one portion of said sheath in a housing;

locating said sheath adjacent at least one section of said first portion and at least one section of said second portion;

encompassing at least one portion of said space between said first portion and said second portion with said sheath in said first state; and causing said sheath to transform from said first state to said second state.

2. The method of claim 1 wherein said sheath is a heat shrink material having a first portion and a second portion and wherein said encompassing comprises:

positioning said heat shrink material first portion adjacent said optical assembly first portion; and positioning said heat shrink material second portion adjacent said optical assembly second portion.

3. The method of claim 2 wherein said causing said sheath to transform comprises heating said heat shrink material to cause said heat shrink material to shrink.

4. The method of claim 1 wherein said sheath is a heat shrink tube material having a first opening and a second opening, wherein said encompassing comprises:

positioning said heat shrink tube material first opening adjacent said optical assembly first portion; and positioning said heat shrink tube material second opening adjacent said optical assembly second portion.

5. The method of claim 4 wherein said causing said sheath to transform comprises heating said heat shrink tube material to cause said heat shrink tube material to shrink.

6. The method of claim 1 wherein said sheath is substantially comprised of polyolefin.

7. The method of claim 1 wherein said first portion comprises a printed circuit board.

8. The method of claim 1 wherein said second portion comprises a lip member.

9. The method of claim 1 further comprising locating said at least one photodetector in a housing.

10. The method of claim 1 wherein said at least one photodetector comprises a linear array of photodetectors.

11. An optical scanning device comprising:
a first portion and a second portion, wherein said first portion is separated from said second portion by a space;
at least one photodetector located in said space between said first portion and said second portion;
a sheath extending between at least one section of said first portion and at least one section of said second portion; and
a housing substantially encompassing said sheath;
wherein said sheath is capable of transforming from a first state to a second state, wherein the area of said sheath in said first state is greater than the area of said sheath in said second state.

12. The device of claim 11 wherein said sheath is a heat shrink material.

13. The device of claim 11 wherein said sheath is a heat shrink tube.

14. The device of claim 11 wherein said sheath is a polyolefin material.

15. The device of claim 11 wherein said sheath is an elastomer.

16. The device of claim 11 wherein said sheath is comprised of a dark-colored material.

17. The device of claim 11 wherein said first portion is a printed circuit board.

18. An optical scanning device comprising:
a housing;
an optical device located in said housing, said optical device comprising:
a first portion and a second portion, wherein said first portion is separated from said second portion by a space;
at least one optical component located in said space between said first portion and said second portion; and
a sheath extending between at least one section of said first portion and at least one section of said second portion;
wherein said sheath is capable of transforming from a first state to a second state, wherein the area of said sheath in said first state is greater than the area of said sheath in said second state.

19. An optical scanning device comprising:
a housing; and
an optical device located in said housing, said optical device comprising:
a first portion and a second portion, wherein said first portion is separated from said second portion by a space;
at least one photodetector located in said space between said first portion and said second portion; and
a sheath extending between at least one section of said first portion and at least one section of said second portion;
wherein said sheath is capable of transforming from a first state to a second state, wherein the area of said sheath in said first state is greater than the area of said sheath in said second state.

20. The device of claim 19 wherein said optical scanning device is a hand-held optical scanning device.

* * * * *

UNITED STATES PATENT AND TRADEMARK OFFICE
CERTIFICATE OF CORRECTION

PATENT NO. : 6,555,812 B1
DATED : April 29, 2003
INVENTOR(S) : David B. Bohn

It is certified that error appears in the above-identified patent and that said Letters Patent is hereby corrected as shown below:

Column 14,
Lines 3-20, delete "An optical scanning device comprising:
 a housing;

an optical device located in said housing, said optical device comprising:
   a first portion and a second portion, wherein said first portion is
   separated from said second portion by a space;
   at least one optical component located in said space between said
   first portion and said second portion; and
   a sheath extending between at least one section of said first portion
   and at least one section of said second portion;
   wherein said sheath is capable of transforming from a first state to
   a second state, wherein the area of said sheath is said first state is
   greater than the area of said sheath in said second state."

and insert therefor -- The device of claim 11 wherein said second portion is a lip
 member. --

Signed and Sealed this

Twenty-sixth Day of October, 2004

JON W. DUDAS
*Director of the United States Patent and Trademark Office*